(12) United States Patent
Ward et al.

(10) Patent No.: US 9,075,882 B1
(45) Date of Patent: Jul. 7, 2015

(54) RECOMMENDING CONTENT ITEMS

(75) Inventors: Alan Ward, Thorton, CO (US); Patrice Olivier Gautier, San Francisco, CA (US); Garrick Nadim Toubassi, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 1051 days.

(21) Appl. No.: 11/249,173

(22) Filed: Oct. 11, 2005

(51) Int. Cl.
*G06F 17/30* (2006.01)

(52) U.S. Cl.
CPC ................................ *G06F 17/30867* (2013.01)

(58) Field of Classification Search
CPC ............................................... G06F 17/30867
USPC ........ 707/5, 1, 3, 4, 104.1, 999.003, 999.104, 707/748; 715/515; 705/27, 7, 8, 9, 26
See application file for complete search history.

(56) References Cited

U.S. PATENT DOCUMENTS

| | | | |
|---|---|---|---|
| 5,749,081 A * | 5/1998 | Whiteis | 707/102 |
| 6,041,311 A * | 3/2000 | Chislenko et al. | 705/27 |
| 6,195,657 B1 * | 2/2001 | Rucker et al. | 707/5 |
| 6,266,649 B1 * | 7/2001 | Linden et al. | 705/26 |
| 7,523,477 B2 | 4/2009 | Ellis | |
| 2002/0002486 A1 | 1/2002 | Loeb et al. | |
| 2002/0178159 A1 | 11/2002 | O'Brien | |
| 2003/0005133 A1 | 1/2003 | Banerjee et al. | |
| 2003/0105682 A1* | 6/2003 | Dicker et al. | 705/27 |
| 2003/0135490 A1* | 7/2003 | Barrett et al. | 707/3 |
| 2005/0177766 A1 | 8/2005 | Lee et al. | |
| 2006/0020614 A1* | 1/2006 | Kolawa et al. | 707/100 |

OTHER PUBLICATIONS

Breese et al., Empirical Analysis of Predictive Algorithms for Collaborative Filtering, Jul. 1998.
Sarwar et al., Using Filtering Agents to Improve Prediction Quality in the GroupLens Research Collaborative Filtering System.
Schafer et al., E-Commerce Recommendation Applications.
Paul Perry, A Minimalist Implementation of Collaborative Filtering, Nov. 2000.
Sarwar et al., Analysis of Recommendation Algorithms for E-Commerce.
Sarwar et al., Item Based Collaborative Filtering Recommendation Algorithms.
George Karypis, Evaluation of Item-Based Top-*N* Recommendation Algorithms.
Sarwar et al., Application of Dimensionality Reduction in Recommender System—A Case Study.
Deshpande et al., Item-Based Top-*N* Recommendation Algorithms.

* cited by examiner

*Primary Examiner* — Alexey Shmatov
(74) *Attorney, Agent, or Firm* — Morgan, Lewis & Bockius LLP

(57) ABSTRACT

Recommending content items is disclosed. In some embodiments, determining an item to recommend includes receiving an indication that a first item is of interest and selecting a second item to recommend based at least in part on a degree of similarity of the second item to the first item as determined based at least in part on a number of other instances in which both the first item and the second item have been of interest and a first decayed popularity of the first item. In some embodiments, the degree of similarity of the second item to the first item is determined based in addition on a second decayed popularity of the second item.

24 Claims, 11 Drawing Sheets

RECOMMENDING CONTENT ITEMS

BACKGROUND OF THE INVENTION

Techniques have been used to identify and recommend to a user content items that are similar to or related to a particular content item that the user has selected, accessed, purchased, expressed interest in, etc. In one approach, a large matrix is formed, for example, with each column of the matrix corresponding to a different user and each row corresponding to a different item. Each cell of the matrix corresponds to a particular user and a particular item, and the value entered into each cell depends upon whether that particular user has purchased that particular item. For example, a "1" is entered into the cell if the user has purchased the item and a "0" if the user has not purchased the item. Recommendations of items may be determined by measuring the similarities between users or items.

For example, the vector corresponding to a first user may be compared with other user vectors to determine similarity in preferences (e.g., by similar purchases made by each user). The dot products between pairs of vectors may be computed, and a second user vector that results in a large dot product with the first user vector is deemed to indicate that the second user is highly similar to the first user and, therefore, likely has similar preferences as the first user. The items purchased by the second user that have not been already purchased by the first user are presented to the first user as recommendations. A similar technique can be used to determine similarities between an item purchased by a given user and other items in the matrix in order to generate recommendations for similar items. In this case, other items that have been purchased by most of the same users are deemed to be similar to a given item. Overall, however, the matrix based approach is not optimal because it requires a very large matrix and associated storage and processing resources.

Other prior art approaches rely on determining the similarity between two items based at least in part upon a count of the number of times both items in the pair of items have been purchased by users. However, typically such approaches fail to correct for highly popular and, likewise, highly unpopular items, resulting in skewed similarity values in such cases and/or are not sufficiently sensitive to changes in popularity.

Thus, there is a need for an improved way to recommend content items.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Recommending content items is disclosed. In some embodiments, determining an item to recommend includes receiving an indication that a first item is of interest and selecting a second item to recommend based at least in part on a degree of similarity of the second item to the first item as determined based at least in part on a number of other instances in which both the first item and the second item have been of interest and a first decayed popularity of the first item. In some embodiments, the degree of similarity of the second item to the first item is determined based in addition on a second decayed popularity of the second item.

Figure 1:
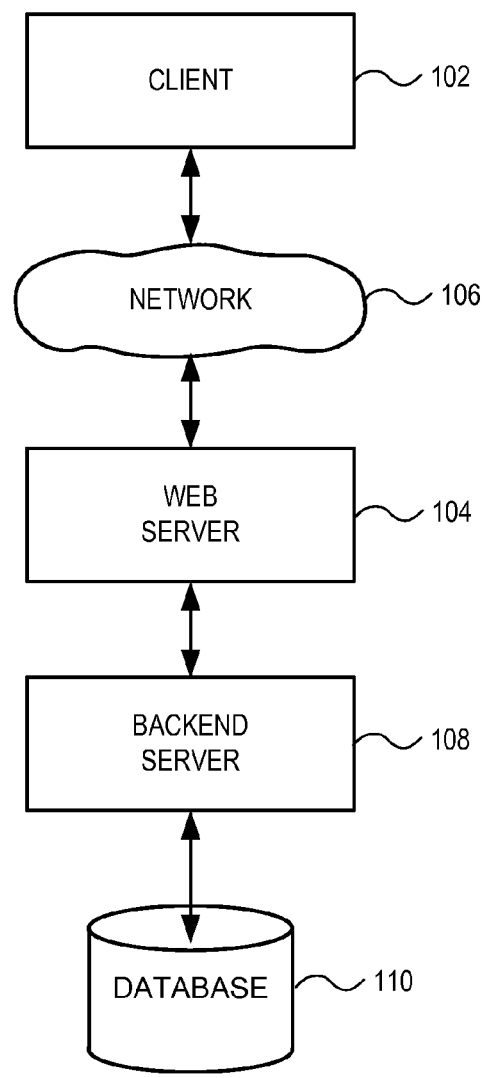
FIG. 1 illustrates an embodiment of a network environment in which a client requests content from a web server.

FIG. 1 illustrates an embodiment of a network environment in which a client requests content from a web server. In the given example, client 102 communicates with web server 104 via a network 106. Network 106 may be any internal or external network, such as a LAN, WAN, the internet, etc. Backend server 108 provides additional services and data to web server 104 and employs a database 110 to store data. In some embodiments, backend server 108 is a part of web server 104. Client 102 may request content from web server 104 by transmitting a request over network 106, and web server 104 may process the request itself and/or forward the request to backend server 108. In some embodiments, a single request by client 102 corresponds to a request for a plurality of content items. In various embodiments, the requested content comprises digital content and/or one or more physical articles. If the requested content comprises digital content, in some embodiments, web server 104 and/or backend server 108 retrieves the requested digital content from its associated storage location and transmits the requested digital content to client 102 over network 106. If the requested content comprises one or more physical articles, in some embodiments, the content request is processed by web server 104 and/or backend server 108, and an order fulfillment process is initiated to cause the one or more physical articles to be sent to the requestor. Regardless of whether the requested content corresponds to digital content and/or a physical article, in some embodiments, backend server 108 determines one or more similar or related content items based at least in part upon the requested content or content items. In some embodiments, backend server 108 determines one or more similar or related content items based at least in part upon one or more past requests for content or content items from client 102 and/or a particular user of client 102. In some embodiments, backend server 108 determines one or more similar or related content items based at least in part upon current and/or past navigation patterns of client 102 and/or a particular user of client 102. Backend server 108 may provide information and/or data associated with one or more similar content items to web server 104 so that web server 104 can recommend one or more similar content items to client 102. In some embodiments, the content or content item request made by client 102 corresponds to a purchase made by a user of client 102 over network 106, and the user receives recommendations to purchase one or more similar items from web server 104.

As sometimes used herein, the term "content item" refers to an item, content, and/or subject that is of interest, for example, to a client and/or a user of the client. In some embodiments, a content item corresponds to digital content, such as text, audio, video, graphics, animations, etc., and may be stored and/or provided in one or more appropriate file formats. In some embodiments, a content item corresponds to one or more physical articles, which in some embodiments, are represented by corresponding digital content or data. As sometimes used herein, the "client" or "user" that expresses an interest in a content item may correspond to a person, process, and/or machine. Although determining and presenting one or more recommendations of similar content items to a user upon the purchase of a particular content item may be sometimes described, recommendations are not limited to purchases. For example, one or more recommendations of similar content items may be determined and presented to a user when a user requests information about one or more particular content items, navigates through web pages or web sites associated with one or more particular content items, shows interest in one or more particular content items, etc.

Figure 2:
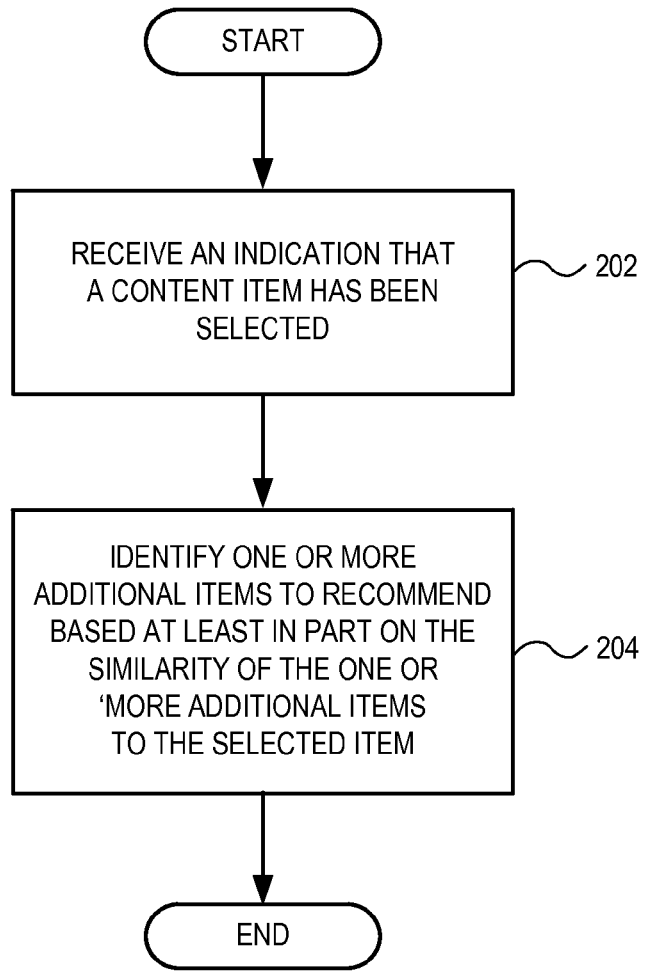
FIG. 2 illustrates an embodiment of a process for recommending content items.

FIG. 2 illustrates an embodiment of a process for recommending content items. In the example shown, at 202 an indication that a content item has been selected by a user is received. Such an indication may be received, for example, when a user expresses interest in the content item, for example, by purchasing the content item, by perusing the content item on one or more related web sites, by navigating through web pages associated with the content item, by downloading and/or uploading the content item, etc. At 204, one or more additional content items to recommend to the user are identified based at least in part on the similarity of the one or more additional items to the item selected at 202. In some embodiments, the similarity between one or more recommended content items and the selected content item is based at least in part on the popularities of the one or more recommended content items and/or the selected content item.

In some embodiments, the popularity of a content item is based at least in part on a count associated with the item. For example, each time a content item is selected, a count associated with the item is incremented by a predetermined amount (e.g., by one). In some embodiments, the count is not incremented each time a content item is selected but after a predetermined period of time. For example, at the end of a given day, the number of a specific content item purchased on that day may be added to a count that represents the cumulative number of the content item purchased before that day. In some embodiments, the popularity of a content item is computed by adjusting the count associated with a content item by a factor in order to take into account variation of popularity over one or more variables, such as time, location, etc. In some embodiments, the popularity of a content item is computed by decaying or discounting the count associated with the content item by a factor for each passage of a predetermined period of time so that the popularity is biased towards more recent increments of the count. In some embodiments, the factor is between zero and one, inclusive. A factor of zero resets the count, and a factor of one imparts equal weights to each increment of the count. In some embodiments, a factor of 0.7 is used to calculate the decayed popularity and is applied, e.g., at the end of each day. Equation (1) gives an example of a manner in which a decayed popularity may be computed.

$$dp = dp\_old * factor + current\_period\_count \quad (1)$$

In Equation (1), dp represents decayed popularity; dp_old represents the decayed popularity as of the end of a prior decay period (e.g., at the end of the previous day, for a popularity decayed once nightly), and current_period_count represents a count (e.g., sum) of the number of times the item has been selected since the end of the prior decay period (i.e., since dp_old was computed).

One effect of Equation (1) is that events from earlier decay periods are decayed relative to events from more recent periods, since the factor is applied to the overall popularity at the end of each period. For example, suppose that dp is based upon the number of sales (or equivalently the number of purchases) of a content item per day, that the decay period is a day, and that factor is 0.7. In this example, when computing the decayed popularity, today's sales each count for 1.0, yesterday's sales each count for 0.7, . . . , sales from five days ago each count for 0.16807 (because the effect of Equation (1) would be to have discounted them each of five days by a factor of 0.7, i.e., 0.7^5), etc. Thus, the decayed popularity provides a moving average popularity ranking where only the last two or three days' sales are really significant.

The popularity of an item often changes quickly due to events, such as the item being used on a television show, in a commercial, by a celebrity, etc. The decay factor is selected to ensure that the most relevant information influences the computed popularity to an appropriate degree. For music, for example, the popularity varies greatly over time as tastes change, new titles are released, radio play lists change, etc. For such content, in some embodiments a decay factor of 0.7 and a decay period of one day, which results in selection events having a "half life" of two days in terms of their effect on computed popularity (because every two days an event is decayed by 0.7*0.7=0.49 or about half), results in the computed popularity being determined primarily, or at least most significantly, by the events (e.g., purchases) of the past two days and popularity decaying relatively rapidly for a title that experiences a drop in selection activity. Decayed popularity offers a way to determine how popular an item is in the present as opposed to how popular the item has been in the past. In some embodiments, the extent to which the decayed popularity of an item captures the past depends upon the time frame over which the decayed popularity is computed. Such a time frame can be content item dependent, user dependent, user configurable, periodically reset, etc.

Figure 3:
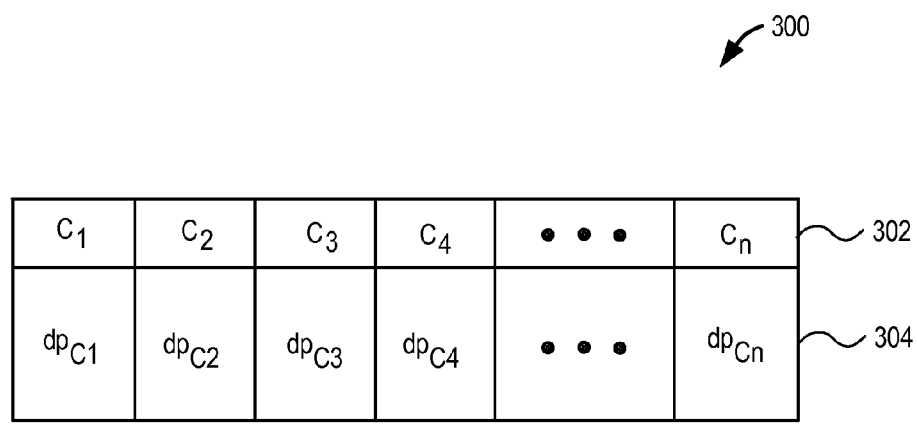
FIG. 3 illustrates an embodiment of a data structure that may be used to store the decayed popularities of one or more content items.

FIG. 3 illustrates an embodiment of a data structure that may be used to store the decayed popularities of one or more content items. In some embodiments, data structure 300 is a part of database 110 of FIG. 1. In the given example, each content item 302 is associated with a corresponding decayed popularity (dp) 304. In various embodiments, a content item (and its corresponding decayed popularity) is removed from data structure 300 if the content item has not been selected for a prescribed period of time and/or falls below a threshold value.

Figure 4:
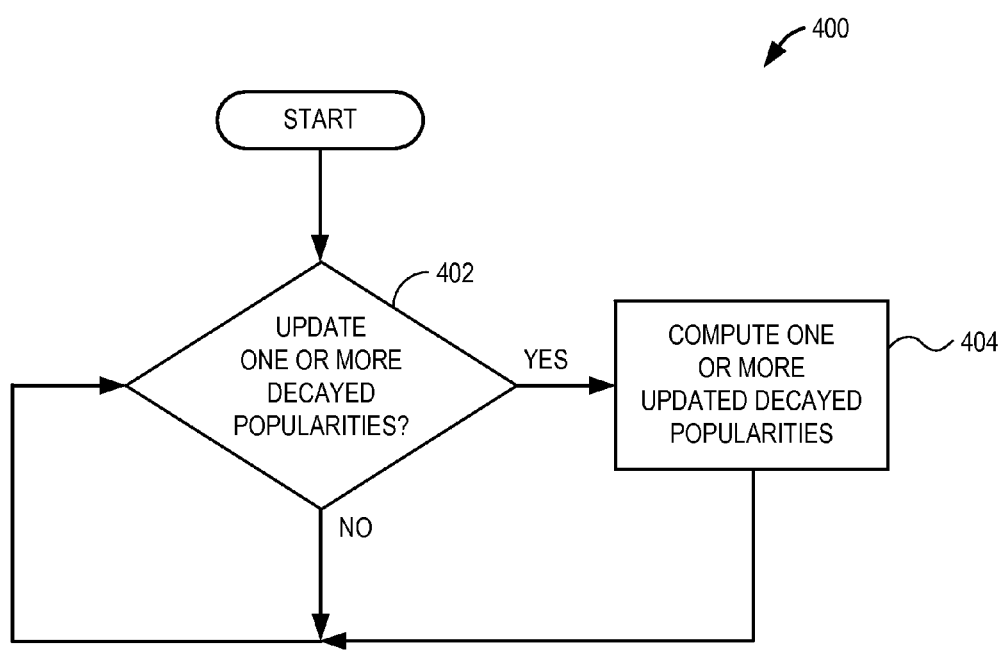
FIG. 4 illustrates an embodiment of a process for updating the decayed popularities of one or more content items.

FIG. 4 illustrates an embodiment of a process for updating the decayed popularities of one or more content items. In some embodiments, process 400 is employed to update one or more of the decayed popularities (e.g., 304) stored in data structure 300 of FIG. 3. At 402 it is determined whether to update one or more decayed popularities. In some embodiments, one or more decayed popularities are periodically updated, and it is determined at 402 whether the time to update has arrived. In some embodiments, each time a content item is selected (e.g., at 202 of FIG. 2), its decayed popularity is dynamically updated. Therefore, in some embodiments, an indication is received at 402 that a content item has been selected. If it is determined at 402 to update one or more decayed popularities, one or more updated decayed popularities are computed at 404, and subsequently process 400 returns to 402 to continue determining whether one or more decayed popularities need to be updated. In some embodiments, Equation (1) is used to compute the one or more updated decayed popularities at 404. If it is determined at 402 not to update one or more decayed popularities, process 400 returns to 402 to continue determining whether one or more decayed popularities need to be updated. In some embodiments, a decayed popularity is updated (e.g., incremented) at each selection event, e.g., each time an associated item is purchased, but decayed, e.g., by applying Equation (1), only periodically.

In some embodiments, the similarity between one or more content items is based at least in part on the decayed popularity of at least one of the content items. Although computing the similarity between a pair of content items may be described, a similar approach may be employed to the compute the similarity between a plurality of content items. In some embodiments, in order to calculate similarity, the decayed popularities corresponding to each of a pair of content items are used to weight a pair count that represents the number of times the pair of items have been selected by user(s). In various embodiments, the pair count itself might be weighted, decayed, and/or subject to a sliding window such that occurrences of the pair that occur outside the window are not included in the count. In some embodiments, a content item pair occurs, and an associated count incremented (and initialized, if not already in existence) when the same user selects a pair of content items within a predetermined period of time.

For example, suppose a user sequentially purchases content items $C_1$, $C_2$, and $C_3$. In some embodiments, at the time item $C_3$ is purchased, the purchase history of the user over a sliding window (e.g., the last thirty days) is checked. If the user's purchase history shows that the user purchased content items $C_1$ and $C_2$ during the current sliding window, then content item pairs ($C_3$, $C_1$) and ($C_3$, $C_2$) are determined to have occurred when the user purchased content item $C_3$ and associated pair counts are incremented. If these content item pairs have not already been generated with respect to the purchases of another user, they are initialized and incremented to reflect the first occurrence of the pair. In this example, content item pair ($C_2$, $C_1$) would have been incremented when the user purchased content item $C_2$ and would have been initialized if the content item pair did not already exist due to the purchases of one or more other users. A pair count that corresponds to a particular content item pair is incremented each time a single user purchases the content items comprising the pair within a predetermined sliding window. In some embodiments, the pair count may be adjusted by a factor, e.g., decayed over time. The size of the sliding window may be adjustable and may depend for example on factors such as the purchase frequency over a particular time period and/or location. In some embodiments, a pair count is periodically reset, for example, when the pair count has not been incremented within any user's current sliding window. Any appropriate time frame over which a pair count is incremented may be selected.

In some embodiments, the similarity of a pair of content items is based at least in part on the pair count of the pair and the individual decayed popularities of the content items comprising the pair. Equation (2) gives an example of a manner in which a similarity score of a pair is computed in some embodiments.

$$S_{C_1 C_2} = \frac{pairCount_{C_1 C_2}}{\sqrt{dp_{C_1}^2 + dp_{C_2}^2}} \qquad (2)$$

In Equation (2), $S_{C_1 C_2}$ represents a similarity score used to determine and quantify the similarity between content items $C_1$ and $C_2$; $pairCount_{C_1 C_2}$ represents the pair count of content item pair ($C_1$, $C_2$); $dp_{C_1}$ represents the decayed popularity of content item $C_1$; and $dp_{C_2}$ represents the decayed popularity of content item $C_2$.

By appropriately weighting the pair count by the decayed popularities of the content items comprising the pair when computing similarity, e.g., as in Equation (2), it is possible to take into account and correct for the dominance of popular content items (e.g., content items that have high counts over many content item pairs). In some cases, if either or both of the content items in a pair have high popularities, a high pair count may appear in the numerator of Equation (2) even though the two items are not in fact similar, e.g., because the highly popular item(s) have appealed to a broad range of users including many with otherwise dissimilar tastes and/or interests in other respects. However, the similarity value or score computed for the pair is prevented from being biased too heavily from the high popularities of either or both by the denominator of Equation (2), which typical would be have a higher value due to high decayed probabilities of either or both content items and therefore would tend to discount the pair count, i.e., decrease the similarity score as compared to a pair of items that have the same pair count but lower decayed popularity values.

In some embodiments, when a given content item is selected by a user, the similarities of the given content item to other content items with which it forms content item pairs are determined, and the one or more content items that result in high similarities with the given content item are recommended to the user. In some embodiments, for each item of content one or more similar items are identified for recommendation prior to the item being selected, and one or more of the predetermined similar items are recommended at a later time at which the item is selected.

Figure 5:
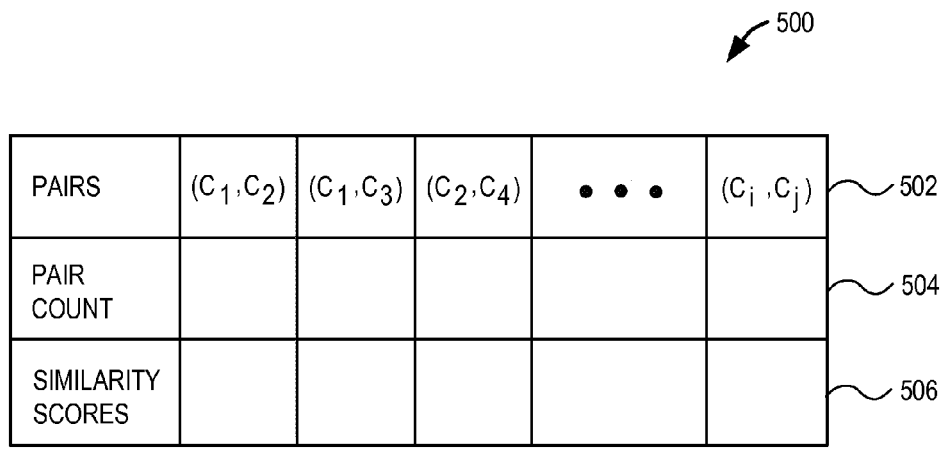
FIG. 5 illustrates an embodiment of a data structure used to store pair counts and similarity scores of one or more content item pairs.

FIG. 5 illustrates an embodiment of a data structure used to store pair counts and similarity scores of one or more content item pairs. In some embodiments, data structure 500 is part of database 110 of FIG. 1. In the given example, each content item pair 502 is associated with a pair count 504 and a similarity score 506. In some embodiments, the content item pairs stored in data structure 500 correspond to the aggregate of all content item pairs for all users with the pair counts corresponding to the number of users that selected each associated pair. In some embodiments, a column is included in data structure 500 only for those pairs that have occurred at least once within an applicable period, i.e., only those pairs that have a pair count greater than zero. In some embodiments, a separate pair count is maintained for each of one or more groups of users, e.g., by region, user demographic data, etc.

Figure 6:
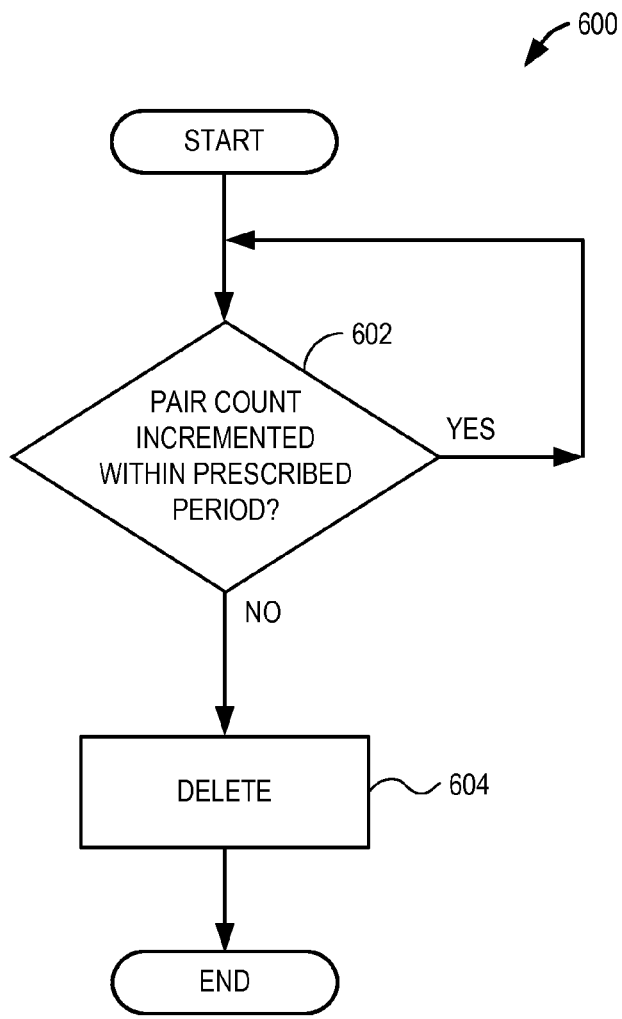
FIG. 6 illustrates an embodiment of a process for purging a content item pair from a data structure.

FIG. 6 illustrates an embodiment of a process for purging a content item pair from a data structure. In some embodiments, process 600 is employed to purge a content item pair and associated data (e.g., pair count, similarity score) from data structure 500 of FIG. 5. At 602 it is determined whether the pair count associated with a content item pair has been incremented within a prescribed period. In some embodiments, the prescribed period corresponds to the amount of time associated with the sliding window used to determine content item pairs. If it is determined at 602 that the pair count associated with the content item pair has been incremented within the prescribed period, the content item pair and corresponding data are continued to be stored in the data structure, and process 600 continues checking at 602. If it is determined at 602 that the pair count associated with the content item pair has not been incremented within the prescribed period, the content item pair and corresponding data are deleted at 604. Alternatively, in some embodiment, a content item pair and its corresponding data are continued to be maintained in the data structure even though the associated pair count has not been incremented within the prescribed period. In some embodiments, instead of deleting the content item pair and associated data at 604, the pair count of the content item pair is reset.

Figure 7:
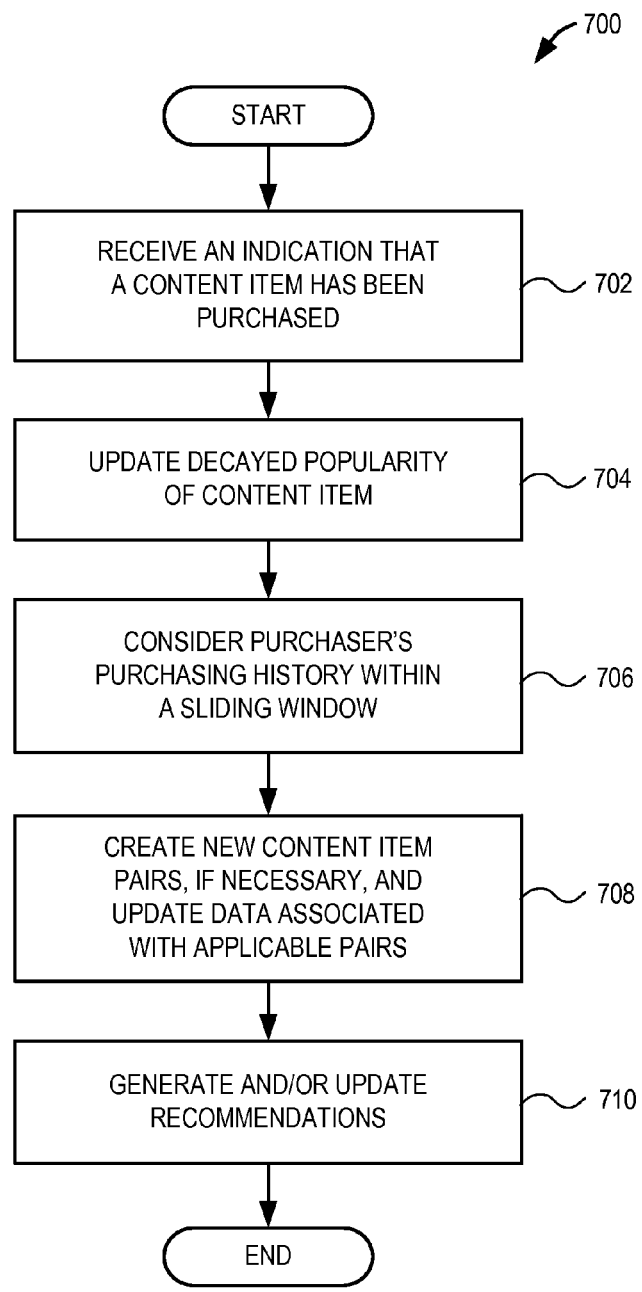
FIG. 7 illustrates an embodiment of a process for generating recommendations of similar content items.

FIG. 7 illustrates an embodiment of a process for generating recommendations of similar content items. In various embodiments, process 700 is used to generate recommendations for a user who has purchased, accessed, used, selected, expressed interest in, etc., a particular content item. At 702 an indication is received that a content item has been purchased. The decayed popularity of the content item is updated at 704 to reflect the purchase. In some embodiments, Equation (1) is employed to compute the updated decayed popularity. In some embodiments, process 400 of FIG. 4 is employed to update the decayed popularity of the content item at 704. At 706, the purchaser's purchasing history is considered within a sliding window to identify which other content items, if any, were purchased within the time frame defined by the sliding window. The sliding window may be adjusted to any appropriate value, e.g., 30 days, 60 days, etc. Based upon the purchaser's purchasing history considered at 706 and the content item purchased at 702, at 708 one or more new content item pairs are created, if the pairs do not already exist, and the data associated with each applicable content item pair is updated. For example, in some embodiments the associated pair count is incremented, and the similarity score is updated to reflect the most current decayed popularities and pair count. In some embodiments, the similarity score is computed using Equation (2). At 710, recommendations of similar content items are generated and/or updated based upon the similarities computed between the content item purchased at 702 and other content items. In some embodiments, 710 includes consulting a predetermined set of recommended items for the item purchased at 702. In some embodiments, 710 includes determining dynamically, at or near the time the content item purchased at 702 is purchased, a set of similar items to recommend. In some embodiments, a predetermined number of the most similar content items (e.g., those with the highest computed similarities) are recommended.

Figure 8:
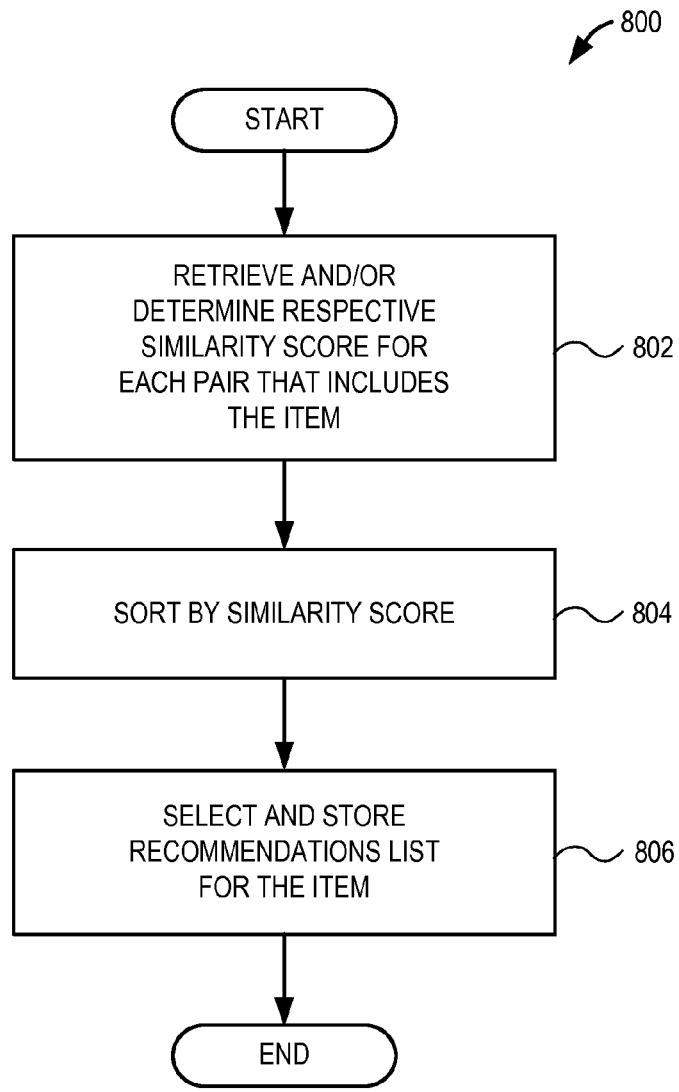
FIG. 8 illustrates an embodiment of a process for generating and storing a recommendation list for a content item.

FIG. 8 illustrates an embodiment of a process for generating and storing a recommendation list for a content item. In some embodiments, process 800 is used to preprocess a content item to generate an associated recommendation list for the content item. Process 800 begins at 802 at which a respective similarity score for each content item pair that includes the content item is retrieved and/or determined. In some embodiment, one or more similarity scores are retrieved from a data structure such as data structure 500 of FIG. 5, which may, for example, be a part of a database such as database 110 of FIG. 1. In some embodiments, one or more of the similarity scores are computed at 802 based upon the most recent stored values of associated pair counts and decayed popularities. At 804, the content item pairs are sorted by similarity score, e.g., from highest to lowest. At 806, a recommendation list for the content item is selected and stored. In some embodiments, a prescribed number of other content items that have the highest similarity scores with the content item as determined at 804 are selected to be included in the recommendation list. In some embodiments, the most similar other content items are positioned at the top of recommendation list, and the similarities fall down the list. In some embodiments, the generated recommendation list is stored in a database such as database 110 of FIG. 1. In some embodiments, the recommendation list generated using process 800 does not reflect the most current selection(s) of the content item when the recommendation list is presented to a user who selects the content item, e.g., the similarities upon which the recommendation list is based upon do not include the updated decayed popularity and pair counts of the content item after the list was generated.

Figure 9:
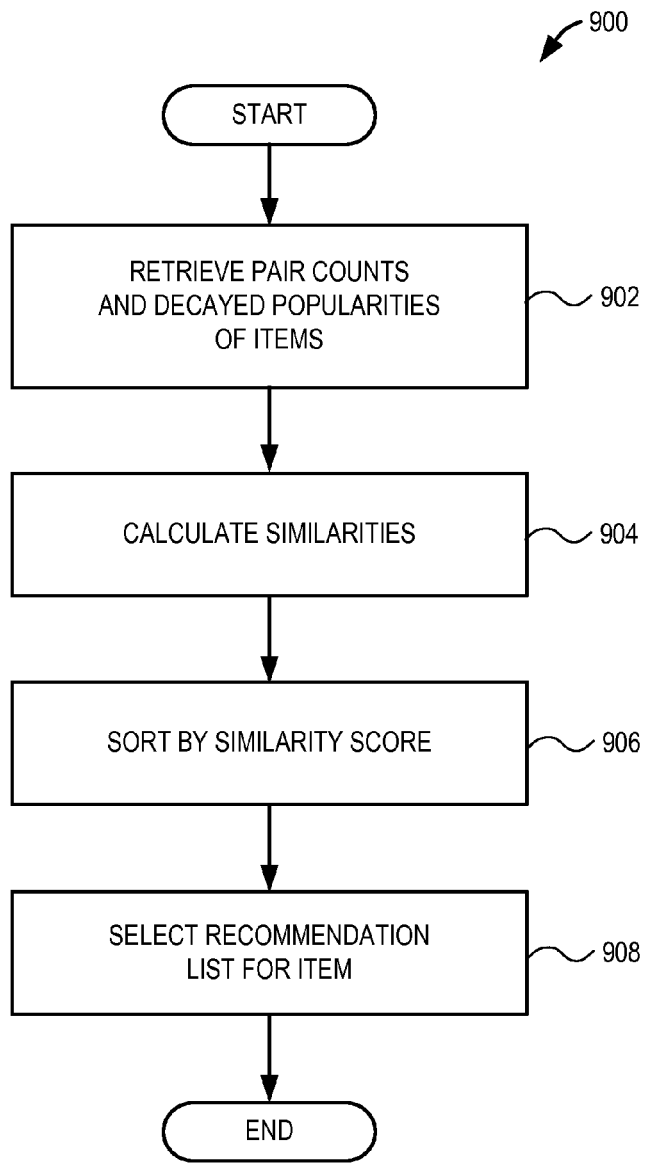
FIG. 9 illustrates an embodiment of a process for generating a recommendation list for a content item.

FIG. 9 illustrates an embodiment of a process for generating a recommendation list for a content item. In some embodiments, process 900 is used to generate a recommendation list for a content item in real time. In some embodiments, process 900 is employed to generate a recommendation list each time a content item is selected. Process 900 starts at 902 at which the pair counts of pairs in which the content item is included and the associated decayed popularities are retrieved. In some embodiments, the values retrieved at 902 correspond to the most up-to-date values. For example, the values may reflect the current selection of the content item for which the recommendation list is being generated. At 904, the data retrieved at 902 is employed to compute similarities. In some embodiments, Equation (2) is used to compute the similarities at 904. At 906, the content item pairs are sorted by similarity score, e.g., from highest to lowest. A recommendation list is selected for the content item at 908. In some embodiments, a prescribed number of other content items that have the highest similarity scores with the content item as determined at 906 are selected to be included in the recommendation list. In some embodiments, the most similar other content items are positioned at the top of recommendation list, and the similarities fall down the list. In various embodiments, one or more of 902, 904, 906, and 908 are performed in advance, e.g., periodically, as opposed to dynamically at the time the need to present a recommendation arises. For example, in some embodiments, 902 and 904 are performed periodically and/or on a rolling or continuous basis as instances of the pair occur, such that for each pair for which data exists a pre-calculated similarity score is available at any moment. In some embodiments, for each item the item pairs for which data exists and of which that item is a member are sorted in 906 in advance, e.g., periodically, based on their respective similarity scores, and the items having the highest similarity scores are identified in 908, in advance of a need to provide a recommendation to a user who purchases the item, such that a predetermined list of items to recommend is available for use at the time of purchase (or other selection).

Figure 10:
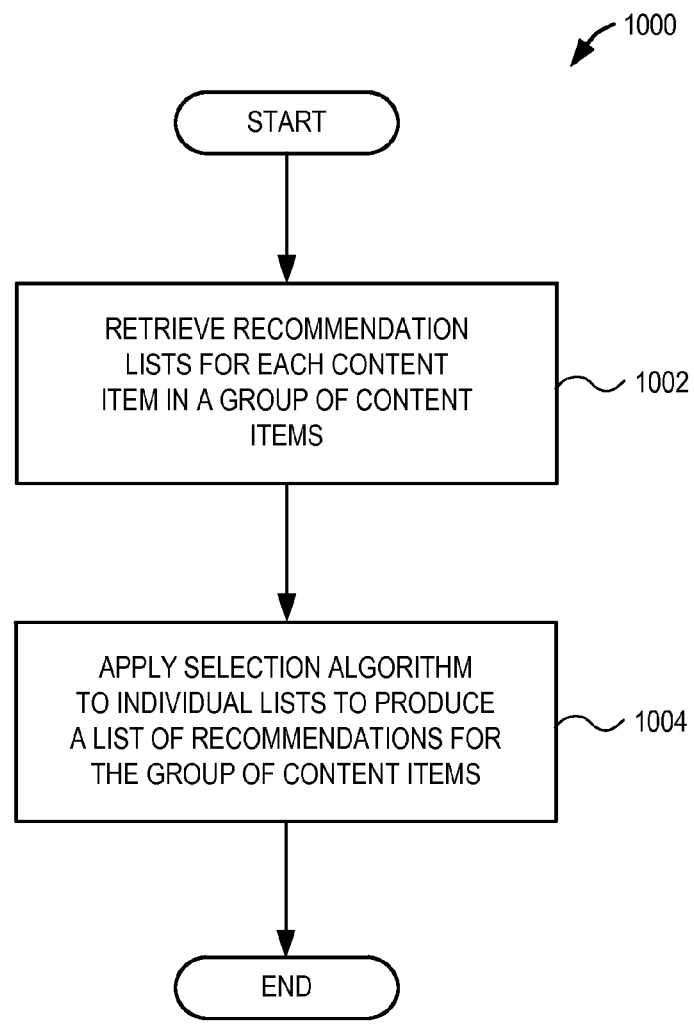
FIG. 10 illustrates an embodiment of a process for generating recommendations.

FIG. 10 illustrates an embodiment of a process for generating recommendations. In some embodiments, process 1000 is employed to generate a recommendation list for a group or list of one or more content items. In some embodiments, process 1000 is employed to generate a recommendation list for a group of items over a predetermined period of time or within a sliding window of time. In some embodiments, process 1000 is employed to generate a recommendation list for a group of content items purchased together or that are part of the same transaction. Process 1000 begins at 1002 at which a recommendation list for each content item in a group of content items is retrieved. In some embodiments, if a recommendation list for a content item does not already exist, a recommendation list is generated for the content item at 1002, e.g., using process 800 or 900. At 1004, a selection algorithm is applied to the lists retrieved at 1002 to produce a list of recommendations for the group of content items. In some embodiments, the items are sorted by similarity score and the items with the highest score (i.e., their similarity score with respect to the item for which they are on the list retrieved in 1002), e.g. the top five items, are recommended. In some embodiments, content items that appear on more than one of the individual recommendation lists are determined and are more likely to be included in the recommendations presented to the user. In some embodiments, if more items than are desired to be recommended occur in more than one list, the items to be recommended are identified based at least in part on their similarity to each other, e.g., as determined based on similarity scores as between them.

Figure 11:
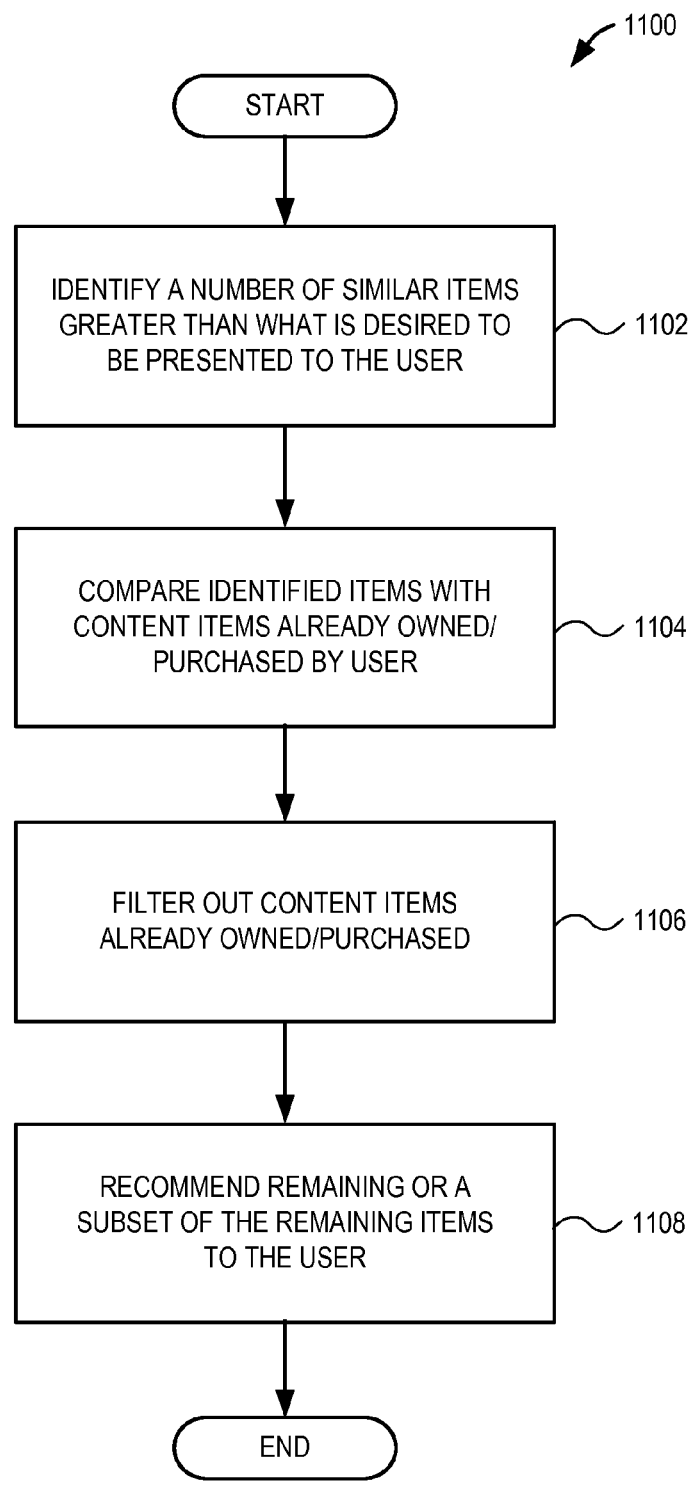
FIG. 11 illustrates an embodiment of a process for generating recommendations to a user.

FIG. 11 illustrates an embodiment of a process for generating recommendations to a user. In some embodiments, the recommendations generated using process 1100 are based not only on the purchase history of the user from a particular web site, store, etc., but also on the content items already owned and/or purchased by the user from other places. Process 1100 begins at 1102 at which a number of similar items that is greater than what is desired to be presented to the user are generated. In some embodiments, the similar items are identified using process 800 or 900. At 1104, the similar items identified at 1102 are compared to content items already owned and/or purchased by the user. In some embodiments, the similar items identified at 1102 are checked or compared against data stored on a host associated with the user. In some embodiments, information associated with content items already owned and/or purchased by the user is provided by the user (e.g., digital content and/or data identifying such content may be uploaded by the user to an associated library and/or data store), e.g., via a client application or agent, web site, store, etc. In some embodiments, a client associated with a particular application compares content items already owned and/or purchased by the user with the items identified at 1102. At 1106, similar content items that are already owned and/or purchased by the user are filtered out, e.g., by an associated client application. At 1108, the remaining similar content items or a subset of the remaining similar content items are recommended to the user. In some embodiments, process 1100 may be used to avoid recommending content that is already owned and/or purchased by the user. In some embodiments, the content already owned and/or purchased by the user, which may not be a part of the user purchase history associated with a particular store or site, may be used to generate the recommendation list.

In some embodiments, recommendations are based upon user interest, access, and/or purchases in an online digital content store, such as a music store. In some embodiments, recommendations may be provided to a user as the user navigates through the online store. In some embodiments, recommendations may be provided to a user based at least in part upon the purchase of one or more songs and/or albums from the music store. In some embodiments, the user may rip music into an associated user account from a CD or some other music source, i.e. from a source other than that particular music store. In some embodiments, the music store may provide more recommendations than needed to a client of the music store that is associated with the user account, and the client filters out recommendations based upon items in the local user library. In some embodiments, since the client is able to track things like star ratings and play counts, the client can employ more advanced scoring techniques to weight certain recommended music albums and/or songs more heavily (e.g., if one of the recommended albums is by an artist that the user has been listening to a lot lately, possibly even right at that moment, the album can be boosted by the client to the top of the recommendation list). In various embodiments, a client performs filtering and/or selection of items to recommend based at least in part on what a user has been indicating an interest in most recently, on what a user is indicating an interest in at the current moment, on what a user has rated highly in the recent past, etc. In some embodiments, a user's interest and/or ratings within a predetermined period of time or over a sliding window is employed. In some embodiments, by having the client perform the filtering and/or selection, an explicit user opt in of his or her library is not needed. Therefore, in some embodiments, the user does not have to upload his or her library if a client is performing the filtering and/or selection of recommendations. In some embodiments, having the client perform the final filtering and/or selection preserves privacy and may overcome user concerns about privacy, legal requirements to protect privacy, practical considerations in maintaining centrally a current list of each user's content, etc.

In some embodiments, some of the techniques described herein are also used to rank lists of top artists, songs, albums, etc., for example, over time and genre. In some embodiments, similar selection techniques are employed to generate a list of top content items on a web site, online store, etc.

As described herein, employing the decaying popularity of at least one content item when determining the similarity between a pair of content items results in improved similarity scores between pairs of content items. A recommendation list corresponding to a given content item can be generated based at least in part on the similarity of the given content item with other content items. The recommendation list may include other content items that are ranked the highest in similarity with the given content item.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining an item to recommend, comprising:

receiving at a processor an indication that a first item is of interest to a user;

determining a second item to recommend to the user based at least in part on a degree of similarity of the second item to the first item; and providing the second item as a recommendation to the user in the event that the second item is not already associated with the user;

wherein the degree of similarity is determined based at least in part on a similarity score that quantifies the degree of similarity of the second item to the first item based at least in part on a number of other instances in which both the first item and the second item have been of interest, a decayed popularity of the first item, and a decayed popularity of the second item;

wherein when computing a particular instance of the similarity score, for each of the first item and the second item, an instance the item has been of interest to another user is given a value that is decayed over time by a non-zero decay factor whose value is based at least in part on a time at which the instance occurred such that a more recent instance in which the item has been of interest to another user contributes more to the decayed popularity of that item than a less recent instance in which that item has been of interest to another user so that the decayed popularity of the item is biased towards more recent instances of interest in the item by one or more other users.

2. A method as recited in claim 1, wherein the non-zero decay factor comprises a multiplier having a value that is less than or equal to one.

3. A method as recited in claim 1, wherein the similarity score is determined at least in part by adjusting the number of other instances in which both the first item and the second item have been of interest by a factor determined at least in part on a value of the decayed popularity of the first item relative to a value of the decayed popularity of the second item.

4. A method as recited in claim 1, wherein the similarity score is determined at least in part by dividing the number of other instances in which both the first item and the second item have been of interest by the square root of the sum of the squares of the decayed popularity of the first item and the decayed popularity of the second item.

5. A method as recited in claim 1, wherein determining a second item to recommend comprises selecting a pair of items from a set of one or more pairs of items, each of which includes the first item.

6. A method as recited in claim 5, wherein each pair in the set of one or more pairs of items comprises a pair of items that were of interest to at least one user within a sliding window.

7. A method as recited in claim 5, wherein for each pair in the set of one or more pairs a similarity score that quantifies the degree of similarity between the items comprising the pair is determined and a pair of items is selected from the set of one or more pairs of items based at least in part on the respective similarity scores of the one or more pairs.

8. A method as recited in claim 1, wherein the second item is one of a plurality of items selected to be recommended.

9. A method as recited in claim 1, further comprising adding the second item to a list of items suitable for being recommended to the user.

10. A method as recited in claim 1, further including determining that the second item is already associated with the user and not recommending the second item to the user based at least in part on the determination that the second item is already associated with the user.

11. A method as recited in claim 10, wherein determining that the second item is already associated with the user includes consulting a record of items associated with the user.

12. A method as recited in claim 10, wherein determining that the second item is already associated with the user includes determining whether the second item is associated with a client application associated with the user.

13. A method as recited in claim 10, wherein determining that the second item is already associated with the user includes checking user data stored on a host associated with the user.

14. A method as recited in claim 1, further comprising selecting the second item based at least in part on what the user has been indicating an interest in most recently.

15. A method as recited in claim 1, further comprising selecting the second item based at least in part on what the user is indicating an interest in at a current moment.

16. A method as recited in claim 1, further comprising selecting the second item based at least in part on what the user has rated highly in the past.

17. A method as recited in claim 1, wherein the first item and the second item comprise digital content.

18. A method as recited in claim 1, wherein the non-zero decay factor comprises a multiplier having a value that is not zero.

19. A system for determining an item to recommend, comprising:
a processor configured to:
receive an indication that a first item is of interest to a user;
determine a second item to recommend to the user based at least in part on a degree of similarity of the second item to the first item; and
provide the second item as a recommendation to the user in the event that the second item is not already associated with the user;
wherein the degree of similarity is determined based at least in part on a similarity score that quantifies the degree of similarity of the second item to the first item based at least in part on a number of other instances in which both the first item and the second item have been of interest, a decayed popularity of the first item, and a decayed popularity of the second item;
wherein when computing a particular instance of the similarity score, for each of the first item and the second item, an instance the item has been of interest to another user is given a value that is decayed over time by a non-zero decay factor whose value is based at least in part on a time at which the instance occurred such that a more recent instance in which the item has been of interest to another user contributes more to the decayed popularity of that item than a less recent instance in which that item has been of interest to another user so that the decayed popularity of the item is biased towards more recent instances of interest in the item by one or more other users; and
a memory coupled to the processor and configured to provide instructions to the processor.

20. A system as recited in claim 19, wherein the similarity score is determined at least in part by dividing the number of other instances in which both the first item and the second item have been of interest by the square root of the sum of the squares of the decayed popularity of the first item and the decayed popularity of the second item.

21. A system as recited in claim 19, wherein the non-zero decay factor comprises a multiplier having a value that is not zero.

22. A computer program product for determining an item to recommend, the computer program product being embodied in a non-transitory computer readable storage medium and comprising computer instructions for:
- receiving an indication that a first item is of interest to a user;
- determining a second item to recommend to the user based at least in part on a degree of similarity of the second item to the first item; and
- providing the second item as a recommendation to the user in the event that the second item is not already associated with the user;
- wherein the degree of similarity is determined based at least in part on a similarity score that quantifies the degree of similarity of the second item to the first item based at least in part on a number of other instances in which both the first item and the second item have been of interest, a decayed popularity of the first item, and a decayed popularity of the second item;
- wherein when computing a particular instance of the similarity score, for each of the first item and the second item, an instance the item has been of interest to another user is given a value that is decayed over time by a non-zero decay factor whose value is based at least in part on a time at which the instance occurred such that a more recent instance in which the item has been of interest to another user contributes more to the decayed popularity of that item than a less recent instance in which that item has been of interest to another user so that the decayed popularity of the item is biased towards more recent instances of interest in the item by one or more other users.

23. A computer program product as recited in claim 22, wherein the similarity score is determined at least in part by dividing the number of other instances in which both the first item and the second item have been of interest by the square root of the sum of the squares of the decayed popularity of the first item and the decayed popularity of the second item.

24. A computer program product as recited in claim 22, wherein the non-zero decay factor comprises a multiplier having a value that is not zero.

* * * * *